3,418,210
HAMSTER ASCITES TUMOR CELL LINE BHK 21/C.13/T.6/ASCITES USEFUL IN SUBMERGED SERUM-FREE AGAR CULTURES TO SUPPORT VIRUS GROWTH

Frank Kingsley Sanders, London, England, assignor to National Research Development Corporation, London, England, a corporation of Great Britain
No Drawing. Filed Dec. 3, 1964, Ser. No. 415,779
Claims priority, application Great Britain, Dec. 6, 1963, 48,206/63
8 Claims. (Cl. 195—1.8)

ABSTRACT OF THE DISCLOSURE

Polyoma-modified BHK 21 cells are modified to produce new cell lines which can be cultivated in agar. A new agar-containing culture medium is provided which is free of serum and which is useful for culture of the cell lines themselves and for the culture of viruses therein. Polyoma-modified BHK 21 baby hamster kidney cells are inoculated into the hamster cheek pouch to form tumors, removing such a tumor and inoculating it into a hamster subcutaneously to form subcutaneous tumors, inoculating material from the subcutaneous tumors intraperitoneally into a hamster to form hamster ascites tumors and recovering ascites tumor cells from the hamster.

---

This invention relates to cell lines and the cultivation of viruses therein.

The development of new cell lines capable of being subcultured continuously is a subject to which must effort is directed at the present time particularly by virologists since such cell lines offer substantial advantages over primary cultures both in experimental work and in the cultivation of viruses for vaccine production. One such cell line which has recently been developed is the line produced from hamster kidneys by Stocker and McPherson and which is known generally by the reference BHK 21. These cells will support the growth of many viruses and are already in use for the cultivation of foot-and-mouth disease virus on a large scale. BHK 21 cells were also found by their discoveres to be capable of transformation into a malignant line when cultivated in the presence of polyoma virus. The polyoma modified cells were found to be very similar to the parent cell line as regards their ability to support virus growth. These cells can be grown very conveniently in mono-layers and methods have recently been developed for their growth in submerged culture.

It has now been found that polyoma modified BHK 21 cells may be modified further as hereinafter described to produce new cell strains or cell lines which have the additional property that they can be cultivated in agar. Such a property is very useful since it enables the use of techniques which have become standard in bacteriology to be applied to mammalian cells so affording greater facilities for controlling the use of these cells in practice. In addition a new culture medium has been developed which is free of serum and which may be used both for the culture of the cell lines themselves and also for culture of viruses therein.

According to the present invention polyoma modified BHK 21 cells are converted into ascites tumor cells by the following procedure:

1. The cells are inoculated into the cheek pouch of the hamster to establish tumors.

2. Tumors so established are removed and material derived therefrom is inoculated subcutaneously into fresh hamsters.

3. Material obtained from subcutaneous tumors so produced, or tumors obtained by a further passage or passages by subcutaneous implantation in further hamsters, is inoculated intraperitoneally in hamsters whereby transformation of subcutaneous tumors into ascites tumors is achieved.

4. Ascites tumor cells are recovered from the animals.

Experiments in which the above transformation has been achieved were carried out as follows.

Production of ascites cells

A polyoma transformed clone (C13/T6) derived from clone 13 of the original BHK 21 cell line was employed. $5 \times 10^6$ cells, from monolayer cultures, were inoculated into the cheek pouches of 6 hamsters; 16 days later 4 out of 6 animals had developed small (1 mm.) nodules at the site of inoculation. The nodules in 2 of these hamsters subsequently regressed. 72 days after inoculation a pea-sized tumor was removed from one of the remaining animals, chopped in PBS and pieces inoculated into 3 further hamsters, (a) into the cheek pouch, (b) subcutaneously, and (c), intraperitoneally. No animal developed tumors in the peritoneal cavity. However, all three developed subcutaneous tumors, two of them also in the cheek pouch. One subcutaneous tumor and both cheek pouch tumors subsequently regressed. In 63 days the other subcutaneous tumor had grown to a very large size (c. 50 gr. weight) and were transplanted by subcutaneous implantation of small tumor fragments in fresh hamsters, all of which subsequently developed tumors. Two transplantations of these tumors have been carried on for 9 further passages at intervals of 18 days. The tumors grew as a firm non-infiltrating, subcutaneous mass, reaching a weight of over 50 gr. within three months of inoculation.

At passage 2 an attempt was made to transform the subcutaneous into an ascites tumor. A trypsinized cell suspension was prepared from chopped fragments of a 5 gr. subcutaneous tumor which also infiltrated the peritoneal wall, and approximately $1 \times 10^7$ separated cells were inoculated intraperitoneally into each of 3 hamsters. None developed ascites, though when they were examined 3 weeks after inoculation one had multiple tumors on the surface of the gut and peritoneal wall, together with metastases in the liver. A number of these small tumors were removed from the gut and chopped finely in PBS. A suspension of finely chopped fragments plus free cells was then inoculated intraperitoneally into 2 further hamsters. Both were found at autopsy to contain a small amount of bloody ascites in addition to multiple small solid tumors throughout the peritoneal cavity. On microscopical examination the ascites proved to contain a small number of easily recognizable tumor cells in addition to large numbers of red blood cells. The tumor cells were largely freed from the latter by sedimentation in PBS and inoculated into 3 further hamsters, all of which subsequently developed ascites. The tumor has since been carried in the ascitic form for a further 20 passages. The second line of ascites was started as passage 2 and carried for 4 passages. Its cells did not differ from those of the original line.

Behaviour of ascites cells in tissue culture

At passage 7 and all subsequent passages ascites cells from the hamsters have been put into tissue culture. The medium used was that described by MacPherson and Stoker 1962, namely Eagle-Hank's solution containing twice the normal concentration of amino acids and vitamins, tryptose phosphate broth and calf serum. Eagle/Hanks medium is described in "Cell and Tissue Culture"

by John Paul, 2nd Edition, 1961, page 95 (E.S.A. Livingstone). Cells were seeded in Roux flasks, baby's bottles, or Petri dishes at a concentration of $1 \times 10^5$ cells per ml. After overnight incubation most of the cells had attached to glass, and with one change of medium became confluent in 2 or 3 days. The form of growth of cells upon the glass resembled that of the BHK 21 C.13/T.6 cell clone from which the tumor had been ultimately derived. The cells showed little contact inhibition, growing as a randomly arranged felt-work, and continually shed cells into the medium. The latter, although rounded, were themselves capable of attaching to glass and also of rapid growth in suspension in stirred pots. The mean generation time was of the order of 12 hours. At the start of cultivation the cells are very uniform in appearance, but in old cultures, as in washed cells from older tumors in hamsters, a number of bizarre forms can be seen. Commonest among these are (a) giant cells with single nuclei—subsequently shown to be polyploid by Karyotype analysis, and (b), apparently multi-nucleate cells, each containing up to 30 nuclei. The latter were, however, identified in thin sections with the electron microscope as small clumps of mono-nucleate cells, individual cells being very firmly attached to one another by intertwined microvilli and also by desmosomes typical of epithelial cells. Cell boundaries are so closely applied to one another as to be invisible in the lightmicroscope, even under phase contrast illumination.

Recovery of ascites cells from hamsters

The hamster is killed with chloroform. 10 ml. of phosphate saline is injected into the intraperitoneal cavity and a cannula is then inserted into the opposite side of the animal through which the fluid is run off and collected in a long sterile tube. About 15 mls. are obtained from each animal. The cavity is then washed out several times via the cannula and the washings collected in the same way to give a total volume of about 100 mls. The fluid at this stage is contaminated with blood which is eliminated by standing the tube in the cold ($+4°$ C.) for one hour to allow the ascites cells to settle, removing the supernatant and repeatedly washing the ascites cells with further phosphate saline. 3 to 4 ml. of packed ascites cells, which are white in color, are thereby obtained per hamster. On transfer to stirred culture any clumps of cells which are present soon separate to give a suspension of single cells.

Growth on agar

Difco agar is used after washing with acetone by the procedure given by Dulbecco and Vogt, 1954, Journal of Experimental Medicine vol. 99 pp. 167 and 183. The Petri dish is poured in two layers which are made up respectively as follows.

Underlayer

|   | Ml. |
|---|---|
| Agar (3% aqeuous solution, based on dry weight of washed agar) | 25 |
| Eagle/Hanks medium fortified to twice its normal strength of salts, vitamins, amino acids | 40 |
| 10% Tryptose phosphate broth | 10 |
| Calf serum (unheated) | 10 |
| Distilled water | 15 |

The agar is separately maintained at 45° C. and then mixed with a combination of the other components also at 45° C. Prior to use, to every 100 mls. of the above are added 0.8 mls. 4.4% aqueous sodium bicarbonate solution and the resulting medium is poured into Petri dishes (25 ml. per 100 mm. plate, 7 ml. per 50 mm. plate) wherein it sets to a dense gel.

Overlayer

This consists of 2 parts of underlayer medium per one part of the following fluid medium.

| | |
|---|---|
| Eagle/Hanks medium fortified as for underlayer ---percent-- | 80 |
| Calf serum ---do---- | 10 |
| Tryptose phosphate broth ---do---- | 10 |
| Sodium bicarbonate—(0.8 ml. of 4.4% aqueous solution per 100 mls. of other constituents combined). | |

Having mixed these constituents, keeping the temperature at 45° C., 1 ml. of overlay is added to 0.1 or 0.2 ml. of the cell suspension when pouring small plates (2 ml. to 0.5 ml. of cell suspension for standard plates). The final concentration of agar in the underlayer is 0.9% and somewhat less than 0.5% for the overlayer. The agar cultures are then incubated at 37° C. under a controlled atmosphere containing 5–10% $CO_2$ in air. The latter is maintained by means of a special incubator.

The cells may be subcultured after one to two weeks when visible colonies have grown up (a pin-head sized colony contains approximately 200 cells), an individual clone is removed using a Pasteur pipette, mixed with 0.2 ml. of phosphate saline and transferred into a new overlay.

Submerged culture

The ascites tumor cells produced as described above have been found to grow well in a serum-free medium of the following novel composition.

Eagle/Hanks medium containing
1. Twice its normal strength of vitamins and amino acids
2. Tryptose phosphate (e.g. Difco) (2.95 g. per litre)
3. Yeast extract (e.g. Lemco) (2.0 g. per litre)
4. Adjusted to pH 7.0–7.2 (e.g. by addition of 8.0 mls. of 4.4% ag. sodium bicarbonate per litre of medium).

This medium is of special interest since a number of viruses are difficult to cultivate in the presence of serum and therefore a medium which can support both cell and virus growth has practical advantages.

The use of ascites cells hereinbefore described for the growth of viruses to which the cells are susceptible is also a feature of the invention. The capacity of the cells to support growth of a particular virus may be readily determined by testing for the cytopathic effects which are familiar to the virologist. Thus viruses which will grow therein include EMC, Semliki Forest, EEE, Echo 10, Reo 2 and 3, Sendai, fowl plague, adenovirus 5, rabies, herpes, vaccinia, and influenza. Since the cells are not pathogenic for any other species than the hamster, their use in the production of veterinary vaccines e.g. fowl pest and dog distemper is envisaged.

Cell lines devised in the manner described above have been indexed at the MRC Laboratories, Carshalton, Surrey as BHK 21/C.13/T.6 Ascites. They have been deposited with the American Type Culture Collection under No. A.T.C.C. Cl 10.1.

Susceptibility to viruses

The capacity of ascites cells produced as hereinbefore described to support virus growth is determined as follows. The cells are grown as monolayers on glass in babies' bottles in 10 ml. EHTC medium until they have achieved confluence. The medium is then decanted and the cells are washed twice with warm phosphate-buffered saline. Virus inoculum (0.1 ml.) is added and allowed to absorb to the cells over a period from 1–4 hours. Serum-free maintenance medium (5–10 mls.) having the composition described hereinbefore is then added and the cells are incubated at 37° C. and observed daily for cytopathic effect in comparison with control cultures. Where a cytopathic effect is observed the culture fluid is gathered and used to infect fresh cultures. Virus multiplied in this manner is then harvested from the combined culture fluids in the conventional way. The viruses specified in the above list have been shown to multiply by this technique. Yellow fever, West Nile, arbor viruses and influenza give more doubtful results, and confirmation of their growth is in hand. In addition to their use for virus growth the valve of the ascites cells as a research tool is also significant. The ease with which clonal populations can be obtained by the agar-plate technique enables mutants of these cells to be isolated by the use of selective media. Such cells are useful in genetic research.

I claim:

1. Process for the production of cell line of hamster ascites tumor cells useful in submerged serum-free agar cultures to support virus growth which comprises inoculating polyoma-modified BHK 21/C.13/T.6/Ascites cell line of baby hamster kidney cells into the hamster cheek pouch to form tumors removing a tumor so formed and inoculating it into a hamster subcutaneously to form subcutaneous tumors inoculating material from said subcutaneous tumor intraperitoneally into a hamster to form hamster ascites tumors and recovering ascites tumor cells from the animal.

2. Process according to claim 1 in which said subcutaneously-formed tumors are passaged by subcutaneous implantation in a hamster before said intraperitoneal inoculation.

3. A standard bacteriological agar medium-containing hamster ascites tumor cell line having the reference BHK 21/C.13/T.6/Ascites, and mutants thereof, produced in accordance with the process of claim 1.

4. Process which comprises cultivating BHK 21/C.13/T.6/Ascites cell line of hamster tumor cells produced in accordance with the process of claim 1 in an agar culture medium comprising agar, Eagle/Hanks medium containing additional amounts of the vitamins and amino acids normally present therein, and further containing tryptose phosphate an calf serum.

5. Process which comprises cultivating BHK 21/C.13/T.6/Ascites cell line of hamster ascites tumor cells produced in accordance with the process of claim 1 in an agar culture medium comprising agar, Eagle/Hanks medium containing a proportion of its normal vitamins and amino acids greater than the normal proportion, tryptose phosphate and yeast extract, said medium being substantially serum-free.

6. A substantially serum-free hamster ascites tumor cell culture medium comprising BHK 21/C.13/T.6 Ascites cell line of hamster ascites tumor cells produced in accordance with the process of claim 1, in agar, and Eagle/Hanks medium, which contains an additional quantity of the vitamins and amino acids present therein, and containing also tryptose phosphate and yeast extract.

7. A culture medium according to claim 6 in which the proportion of vitamins and amino acids is substantially twice that in the normal composition of Eagle/Hawks medium.

8. Process which comprises cultivating virus in submerged serum-free agar cultures of BHK 21/C.13/T6/Ascites cell line of hamster ascites tumor cells produced in accordance with the process of claim 1 in which the virus is selected from the group consisting of EMC, Semliki forest, equine encephalomyelitis, Echo 10, reoviruses II and III, Sendai, fowl plague (myxoviruses), adenovirus type 5, rabies, herpes and vaccinia.

References Cited

UNITED STATES PATENTS 3,228,840   1/1966   MacPherson et al. _____ 167—78

OTHER REFERENCES

Sanders, F. K., et al., Nature 201:786–789 Feb. 22, 1964 "Ascites Tumors from BHK 21 Cells Transformed in Vitro by Polyoma Virus."

MacPherson et al. 1, Virology 23:291–294 June, 1964 "Agar Suspension Culture for the Selective Assay of Cells Transformed by Polyoma Virus."

LEWIS GOTTS, *Primary Examiner.*

S. K. ROSE, *Assistant Examiner.*